L. C. SHARP.
MACHINE FOR MAKING CYLINDRICAL CAN BODIES.
APPLICATION FILED JUNE 23, 1911.

1,165,721.  Patented Dec. 28, 1915.
12 SHEETS—SHEET 1.

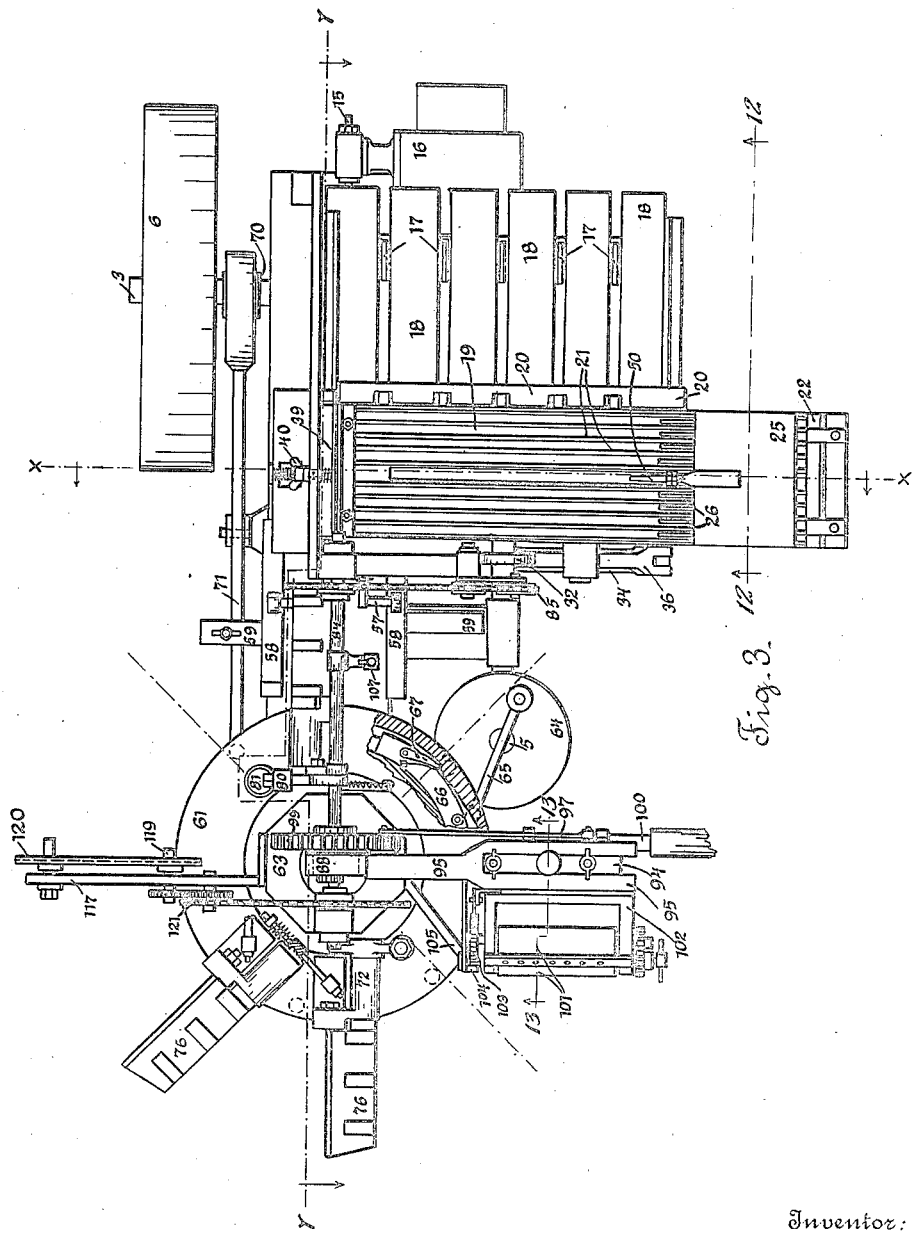

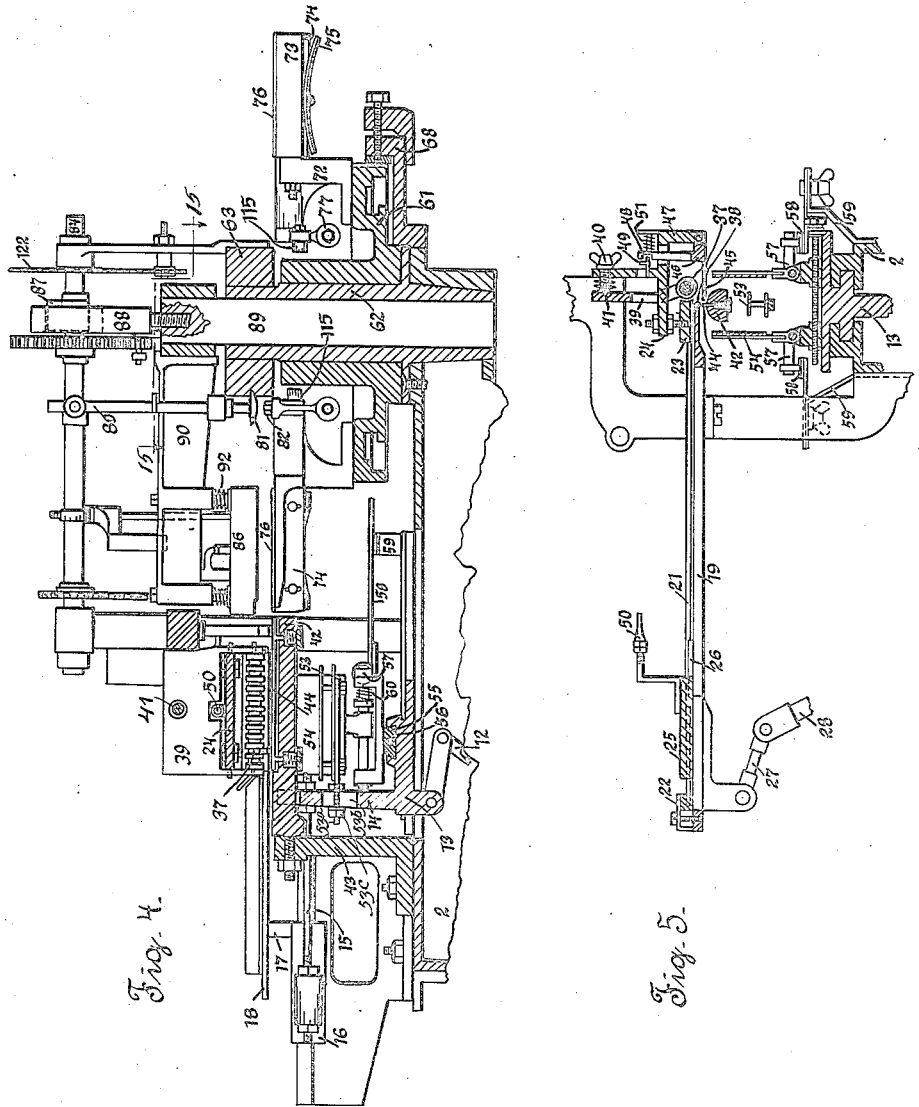

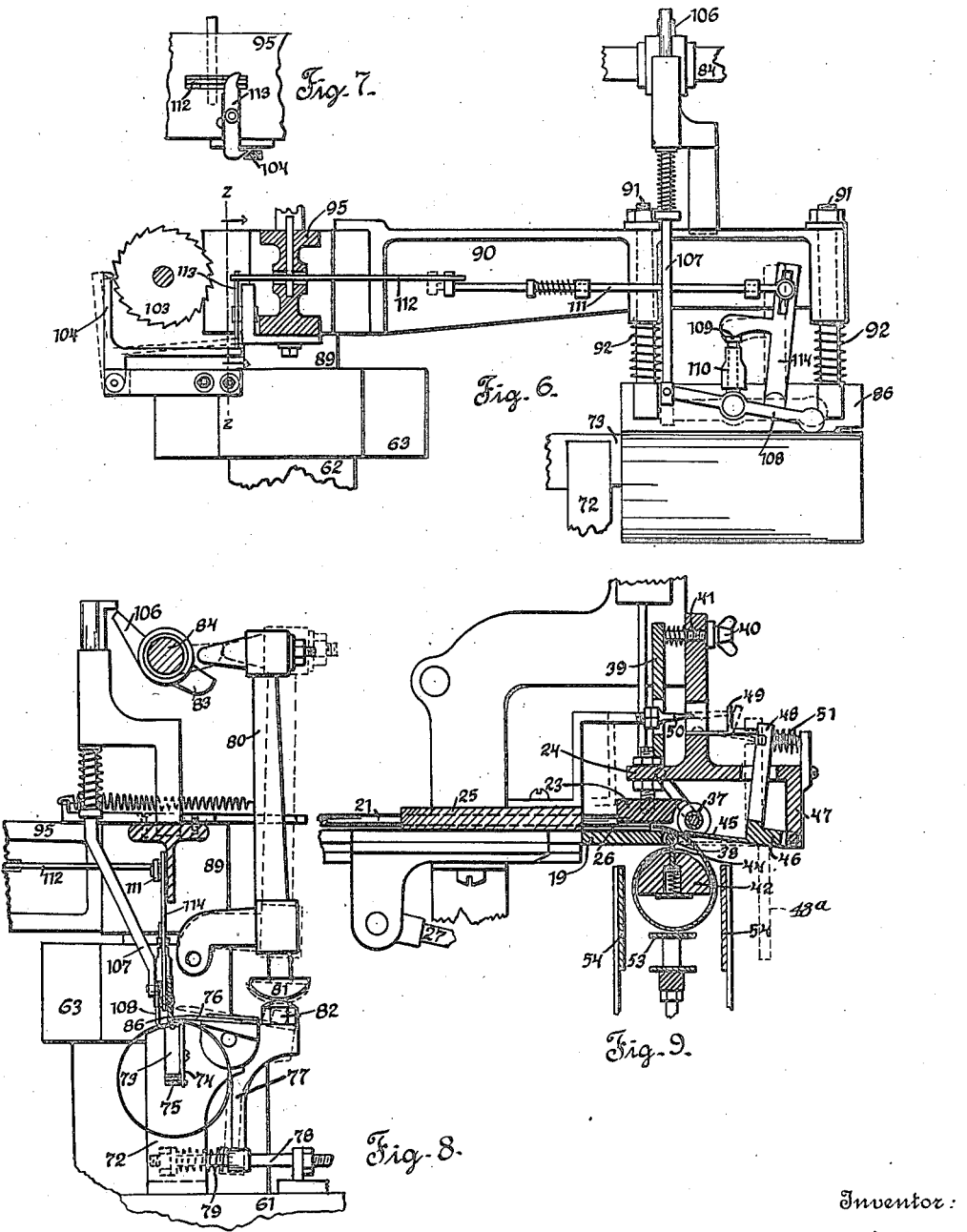

L. C. SHARP.
MACHINE FOR MAKING CYLINDRICAL CAN BODIES.
APPLICATION FILED JUNE 23, 1911.
1,165,721.
Patented Dec. 28, 1915.
12 SHEETS—SHEET 6.
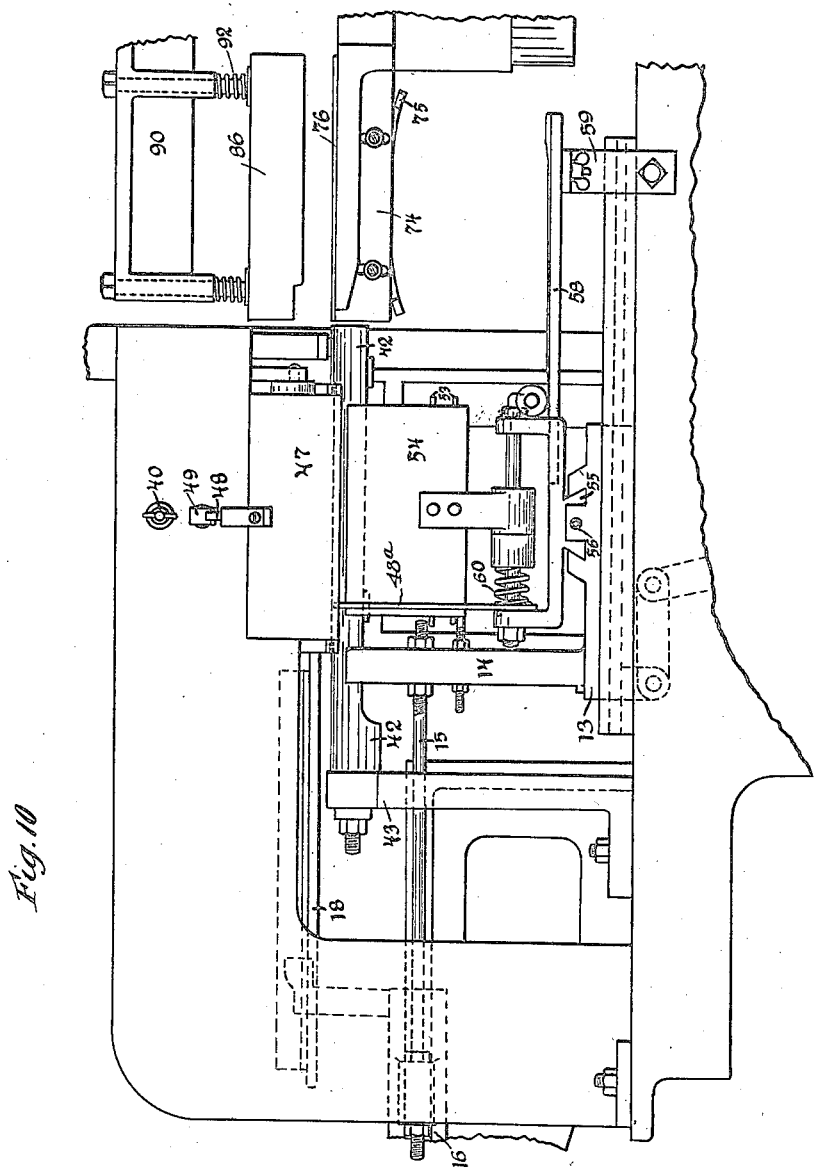

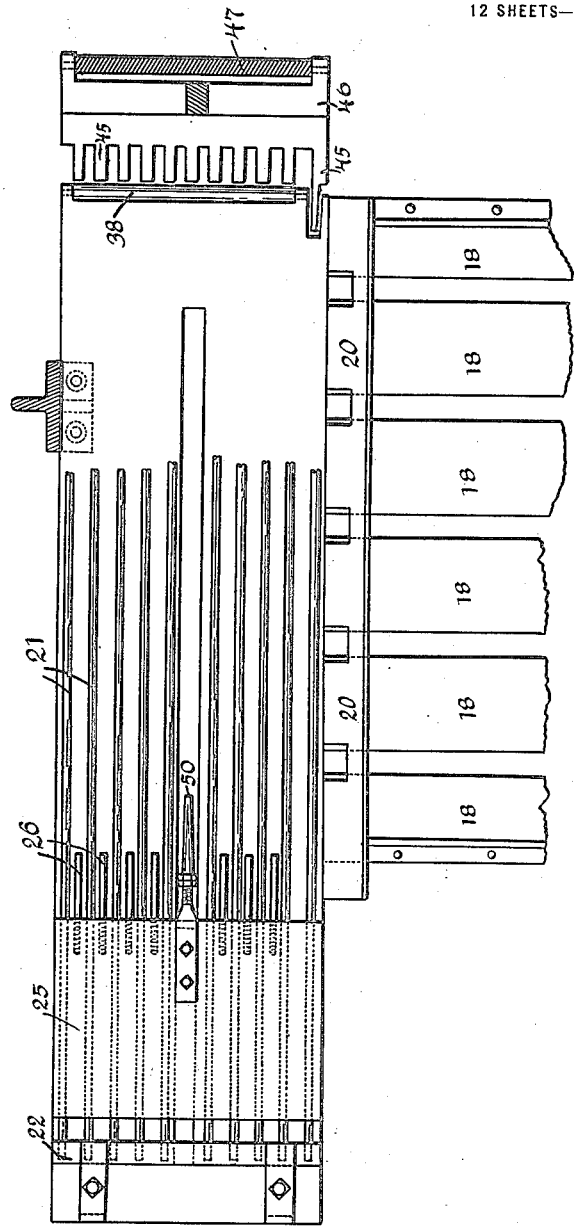

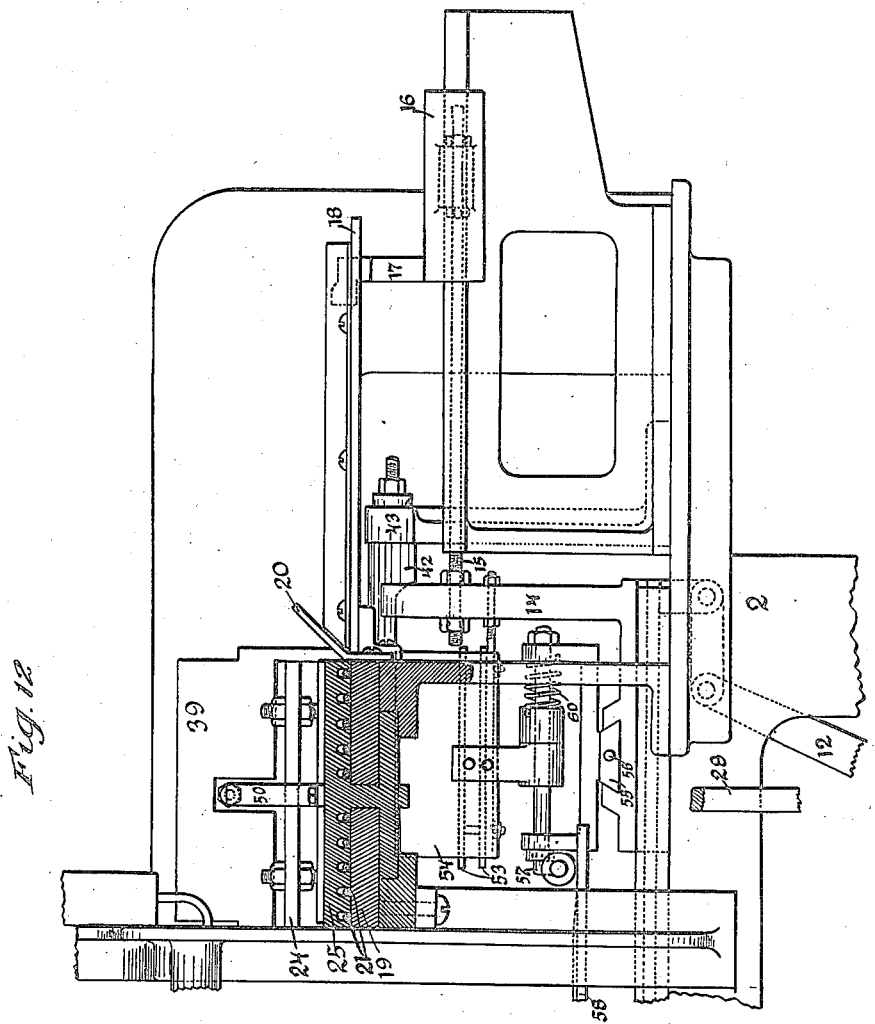

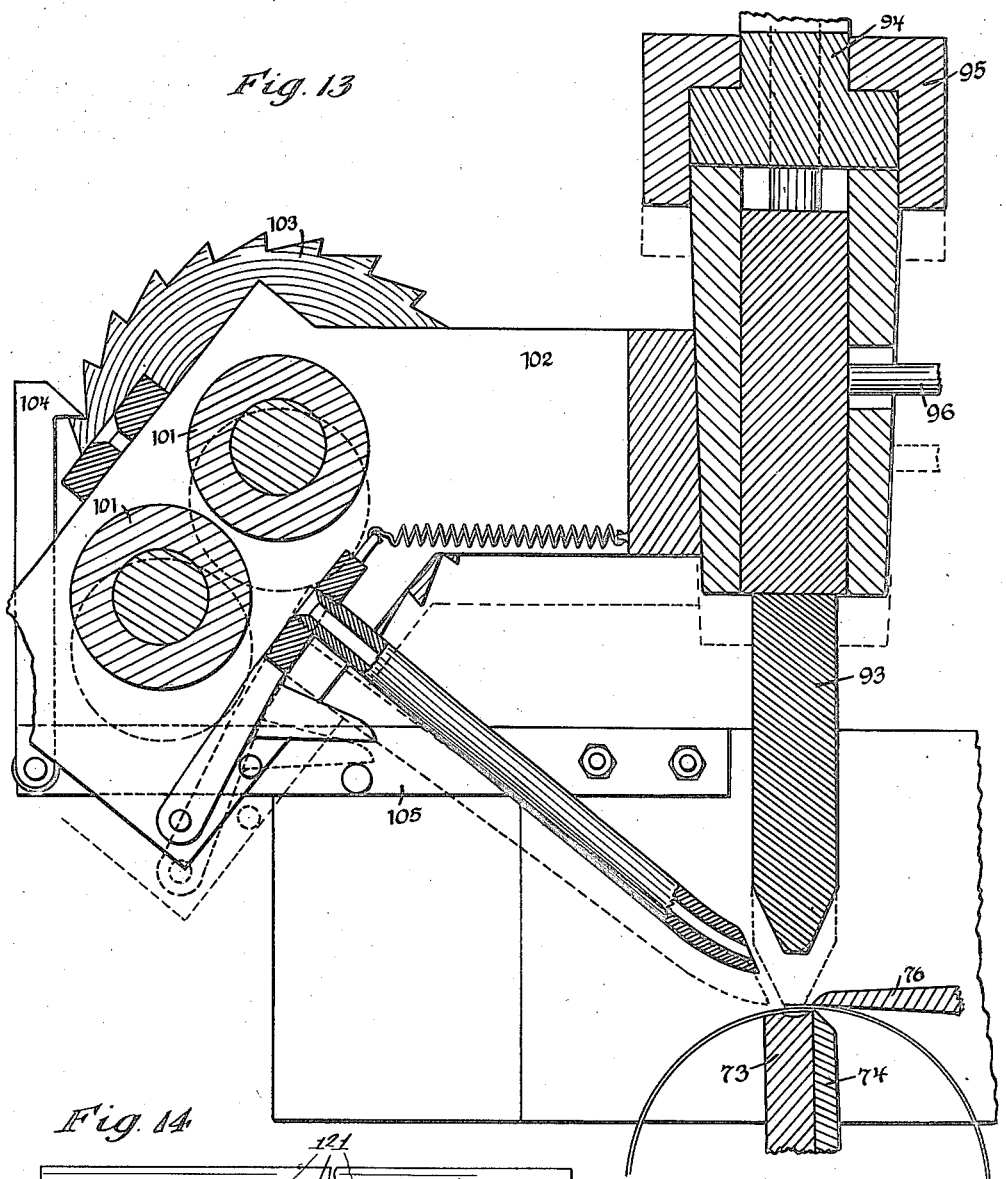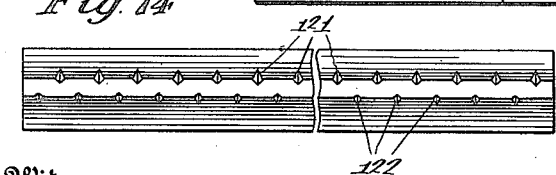

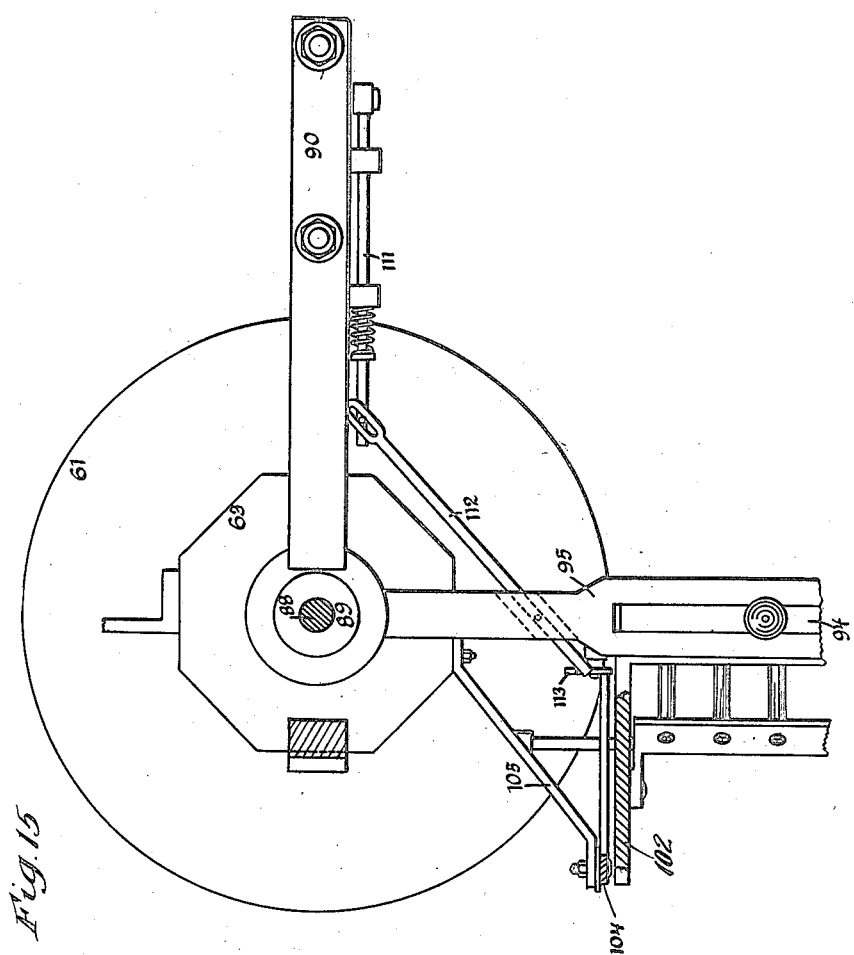

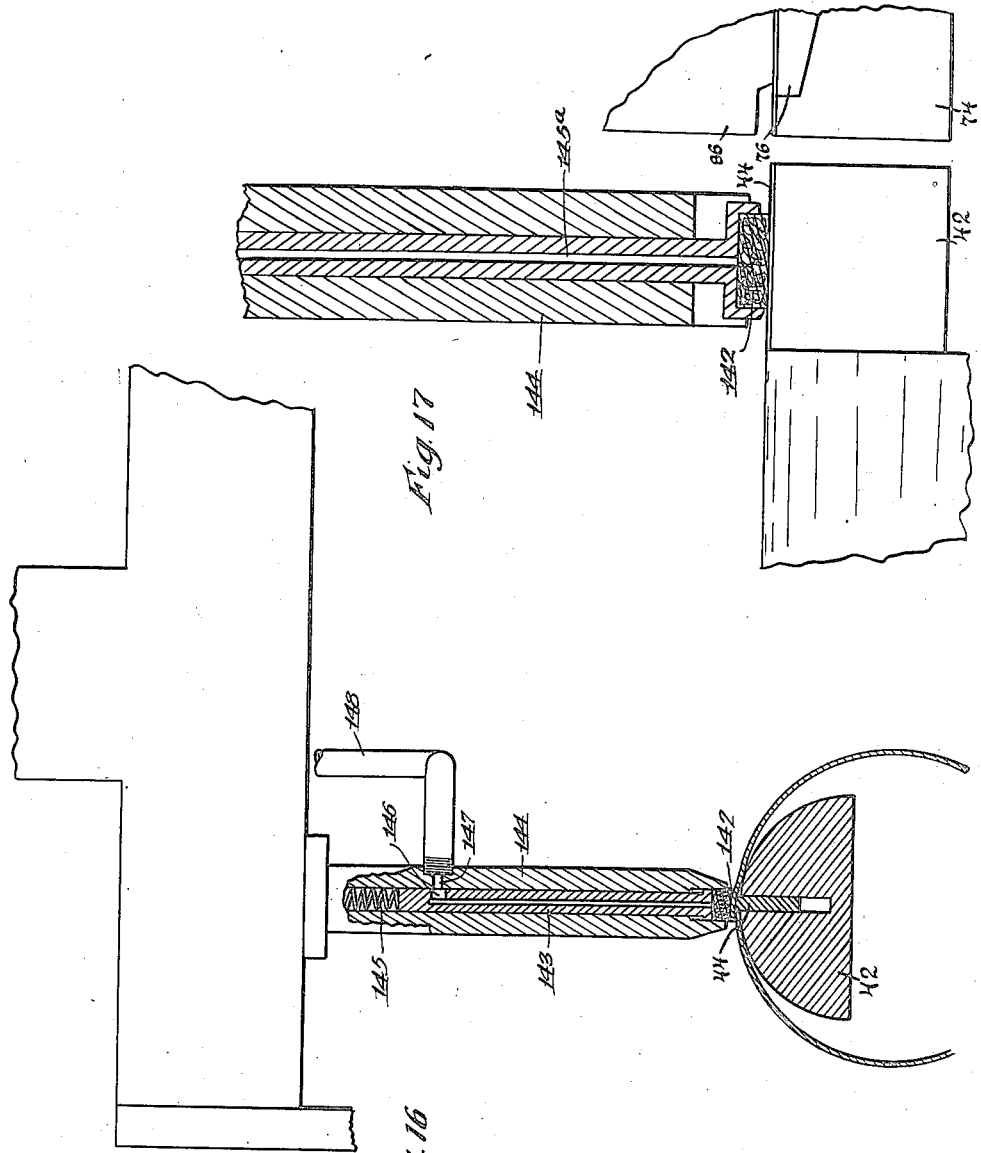

L. C. SHARP.
MACHINE FOR MAKING CYLINDRICAL CAN BODIES.
APPLICATION FILED JUNE 23, 1911.
1,165,721.
Patented Dec. 28, 1915.
12 SHEETS—SHEET 12.
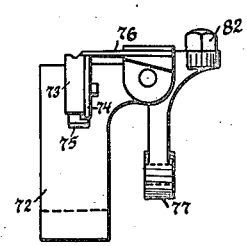
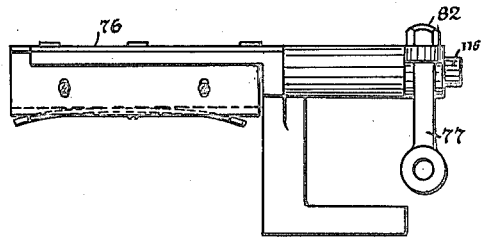
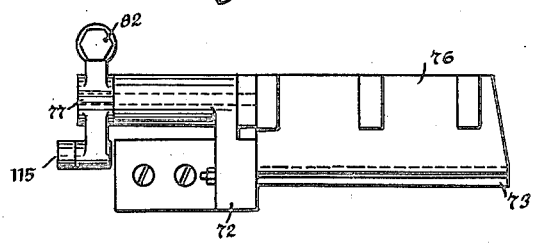
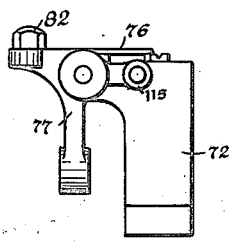
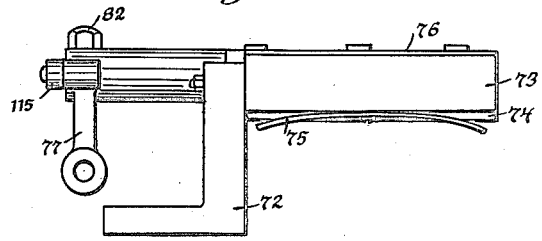

UNITED STATES PATENT OFFICE.

LEE C. SHARP, OF PLATTSMOUTH, NEBRASKA, ASSIGNOR TO AMERICAN CAN COMPANY, OF NEW YORK, N. Y., A CORPORATION OF NEW JERSEY.

MACHINE FOR MAKING CYLINDRICAL CAN-BODIES.

1,165,721.　　　　Specification of Letters Patent.　　Patented Dec. 28, 1915.

Application filed June 23, 1911. Serial No. 635,041.

*To all whom it may concern:*

Be it known that I, LEE C. SHARP, a citizen of the United States, residing in Plattsmouth, in the county of Cass and State of Nebraska, have invented a new and useful Improvement in Machines for Making Cylindrical Can-Bodies, of which the following is a specification.

My invention embraces a machine having a mode of operation by which can-bodies of any diameter or length within certain maximum and minimum sizes may be made with the same mechanism, it being unnecessary to provide interchangeable parts for the different sizes but merely to make slight adjustments of the forming and transporting mechanism when there is to be a considerable variation in the diameters of the can-bodies produced. The machine automatically shapes a sheet-metal blank into cylindrical form, laps the ends of the curled blank, gages the lap of the ends, clamps the lapped ends together and solders them while they are so clamped, and finally ejects the completed body. The elements for performing the various functions are operated in synchronism with each other and are combined with elements for transporting the blank from one operating position to another. The forming mechanism is such that the blank is pushed from its rearward side or end, so that there is no possibility for it to slip or get out of time with the elements for performing the various other operations upon it.

The invention further embraces means for feeding the solder to the soldering devices, arranged so that the solder will be fed only when a can-body is about to be brought to the soldering position.

Figure 1:
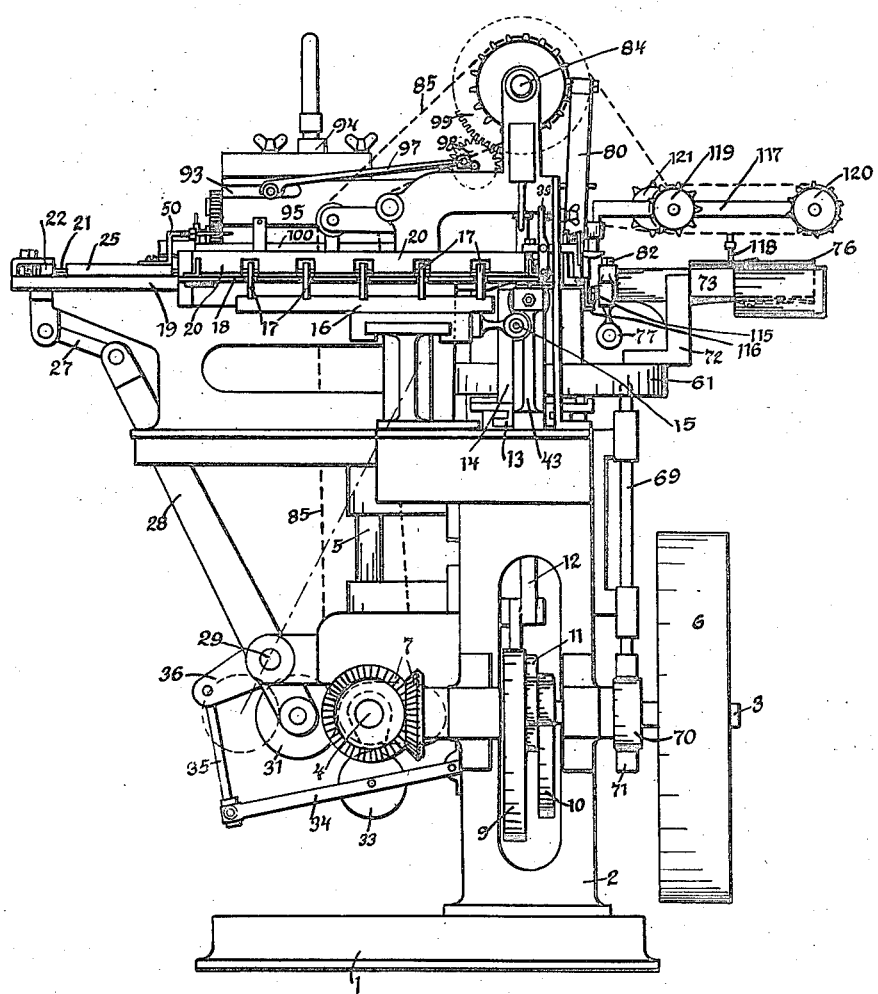
Figure 2:
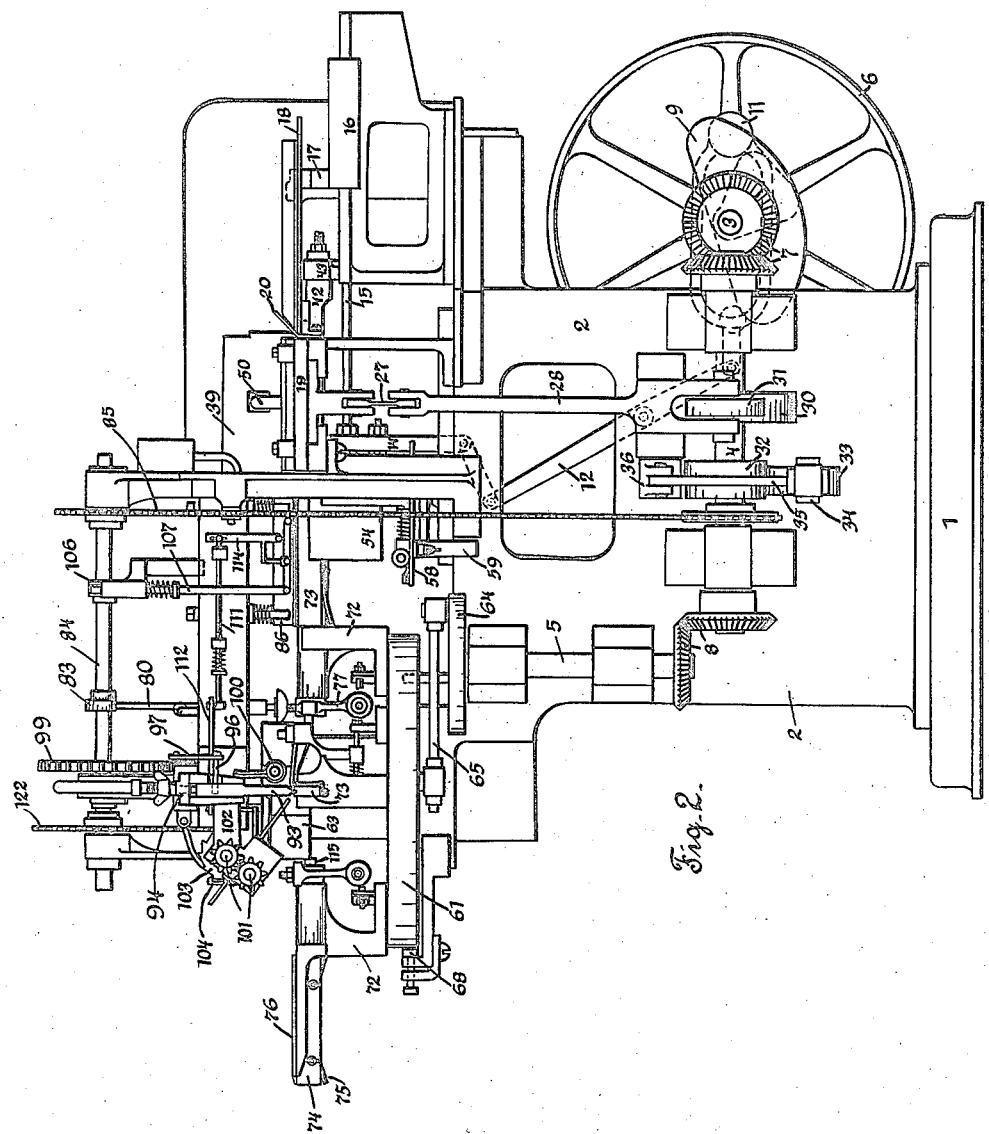

In the accompanying drawings Figure 1 is a front elevation of a machine constructed according to my invention, Fig. 2 is a side elevation of the same, Fig. 3 is a plan view thereof, Fig. 4 is a partial vertical section on the plane of the line $y$—$y$ of Fig. 3, Fig. 5 is a partial vertical section on the plane of the line $x$—$x$ of Fig. 3, Fig. 6 is a detail side elevation of the solder-feed controlling devices, Fig. 7 is a view taken in the plane of the line $z$—$z$ of Fig. 6, Fig. 8 is a front elevation of the lap-forming and gaging devices, and Fig. 9 is an enlarged sectional view of a part of the structure shown in Fig. 5. Fig. 10 is a partial side elevation of the opposite side to that shown in Fig. 1. Fig. 11 is an enlarged partial detail plan of a portion of the machine shown in Fig. 3. Fig. 12 is a vertical section on line 12—12 of Fig. 3. Fig. 13 is a vertical section on line 13—13 of Fig. 3. Fig. 14 is a bottom plan of the soldering iron. Fig. 15 is a detail section on line 15—15 of Fig. 4. Fig. 16 is a sectional view of the fluxing device. Fig. 17 is a section in a plane at right angles to that shown in Fig. 16. Figs. 18, 19, 20, 21 and 22 are detail views of the carrier.

The machine base 1 supports the hollow pedestal 2, on the front and side of which are journaled in suitable bearings the transverse cam-shaft 3, the longitudinal cam-shaft 4 and the vertical crank-shaft 5. The shaft 3 carries a driving pulley 6, and all moving parts of the machine receive power directly or indirectly from said shaft 3, the shaft 4 being driven therefrom through the miter-gears 7, and the shaft 5 being driven from the shaft 4 through the miter gears 8.

On the shaft 3 are cams 9 and 10 which impart a reciprocating motion to a yoke 11 which extends into the pedestal 2 and is connected with a lever 12 fulcrumed thereon. The upper end of the lever 12 is connected with and actuates the transport slide 13. On said slide is a standard 14 which is connected by means of a rod 15 with the feed-slide 16, to which is thus imparted a reciprocating movement the same as that of the transport-slide. The feed-slide is provided with a series of fingers 17 which extend up through slots in the feed-table 18. The sheet metal blanks to be operated upon by the machine are placed upon the feed-table one at a time and while the feed-fingers 17 pause at the front limit of their movement. During the rearward movement of the feed-fingers the blanks are pushed from the feed-table onto the transverse table 19, passing below the guide-plate 20 at the rear of the feed-table and under the guide-rods 21 which rest upon the transverse table. The ends of the guide-rods 21 fit loosely into the block 22 at the outer end of the table and the block 23 carried at the inner end of the table on the frame portion 24, the said blocks serving to hold the rods in position but permitting them to rest upon the surface of the table or upon the sheet-metal blank when it is pushed under them. The blank is pushed across the transverse table by the transverse slide 25. This slide comprises a plate resting upon the table and provided with a plurality of channels through which the guide-rods 21 extend, there being a series of fingers 26 extending from the plate between the guide-rods and adapted to pass below the block 23, and a part extending down through a slot in the table and connected by means of a link 27 with the upper end of the lever 28. The lever 28 is carried on the fulcrum-shaft 29 and is moved in one direction by the action of a cam 30 on the shaft 4, the cam engaging a roller 31 carried on the lower end of the lever. The movement of the lever in the other direction is caused by a cam 32, the cam engaging a roller 33 carried on lever 34, and the outer end of the lever 34 being connected by rod 35 with a crank 36 on shaft 29, as best shown in Fig. 1.

The sheet-metal blank, when pushed across the transverse table by the fingers 26 of the transverse-slide, passes below the block 23 and engages the roller 37, being deflected downward thereby so as to be curled to a cylindrical form. At the end of the transverse table over which the sheet is curled is mounted a small roller 38 which serves to reduce friction and prevent the sheet being scratched during the curling. The radius of curvature given to the sheet is determined by the position of the roller 37, and the position of the roller may be varied by swinging the roller-hanger 39 about its pivot on the frame portion 24, the adjustment being made by means of the thumb-nut 40 upon the screw 41 connected with the upper part of the roller-hanger. The sheet as it is curled passes around the horn 42 which is supported by the standard 43 below the end of the transverse table. In the upper part of the horn is a depressible gage-bar 44 which the ends of the blank touch when the curling operation is completed. To insure the rearward end of the sheet dropping out of engagement with the end of the transverse-table at the conclusion of the curling operation, fingers 45 are provided and arranged to push said end of the sheet down at this time. The fingers 45 are carried on the part 46 which is pivotally connected with the frame portion 47, as best shown in Fig. 9, and are normally held in the raised position shown in said figure, the fingers lying in grooves made in the roller 37. The part 46 has an arm 48 which extends up through an opening in the frame portion and is engaged by a leaf spring 49. The transverse-slide carries an adjustable finger 50 which strikes an upturned part of the spring 49 at the end of the stroke of the slide and bends the spring down as indicated by dotted lines in Fig. 9, so that the end of the spring is brought opposite a notch in the arm 48. The arm is then pushed by spring 51 to the dotted position shown and the fingers 45 strike the end portion of the curled sheet and push it down so that it will engage the bar 44. The parts 45, 46, 48 and 49 are reset to their normal positions during the rearward stroke of the transport-slide 13, a piece 48ª (see Fig. 10) carried by said slide engaging and raising part 46, and said part being retained in raised position by the engagement of spring 49 with arm 48, as shown.

For making can-bodies having tearing-strip-tongues, the end of the transverse table has a notch made therein at the position where the tongues will come, and the roller 38 is not extended across such notch. One of the fingers 45 is made longer than the others so as to extend in over the notch in the end of the table. Thus when the end of the curled blank is pushed down by the fingers 45, as explained, the long finger will also push the tongue down through the notch, so that it will rest on top of the gage-bar 44. Then in the subsequent moving of the curled blank along the horn 42 the gage-bar will be depressed sufficiently to permit the tongue to pass along between the gage-bar and the roller 38 on the end of the table.

As the blank is curled around the horn 42 it is also received within the transporting device. Said device consists of the standard 14 which is mounted on the slide 13 and of which the upper part extends partly around the horn 42 in front of the curled blank; a supporting-shelf 53 which is carried on the standard 14 and is adjustable vertically thereon by means of a threaded rod 53ª movable in a slot 53ᵇ formed in the standard 14 and adapted to be clamped in position by nuts 53ᶜ, (see Fig. 4); and the wings 54 which are pivotally mounted on blocks 55 held slidably in a transverse groove in the transport-slide. A right and left screw 56 is passed through the blocks 55 and is connected with the transport-slide so that by turning the screw the blocks and wings may be moved toward or away from each other. Arms 57 are connected with the pivot-shafts of the wings and are provided at their outer ends with rollers which rest upon rails 58, being held in engagement therewith by means of coil springs 60 arranged upon the pivot-shafts. The rails 58 are adjustable transversely upon their supporting-brackets 59 so that they may be kept in the same relations to the roller and arms 57 when the positions of the wings are changed. The supporting-shelf 53 is adjusted to such a height on the standard 14 that when the curled blank is upon the horn 42 with the ends thereof engaging the gage-bar 44 the lower part of the blank will rest upon the shelf. The blocks 55 are adjusted to such positions on the transport-slide that when the blank is properly curled it will touch the wings 54 lightly, but should the material of the blanks not be uniform so that some of them are not curled so closely as the others, then the more open blanks will be confined by the wings and given the proper curvature to cause their ends to engage the gage-bar 44. At the beginning of the rearward movement of the transport-slide the rollers on the arms 57 pass onto slightly raised portions of the rails 58 and the wings 54 are thereby moved slightly inward so as to confine the curled sheet more closely and insure its ends being held against the gage-bar 44. Further rearward movement of the transport-slide carries the curled sheet off the horn 42 and onto the horn of one of the carriers on which the can-body is completed. As the body is moved off the horn 42 and onto the carrier, flux may be applied to the surfaces which are to be soldered together.

As shown more particularly in Figs. 16 and 17, the flux applying device comprises a wiper 142 secured in a recess at the bottom of a holder 143 slidably mounted in a vertical stationary arm 144 and normally held in a lowered position by means of a spring 145 disposed within the arm 144, the holder 143 provided with a feed passage 145ª terminating at its upper end in a laterally extending passage 146 which is positioned, normally, below the supply duct 147, the latter being connected as by a pipe 148, to any suitable tank adapted to contain the liquid flux. The flux applying device is located over the horn 42 intermediate the place where the blank is curled and its end, and as the curled can body blank is pushed along said horn to one of the receiving horns on the turret, the wiper 142 is raised against the action of the spring 145 to thereby supply the wiper with acid or other suitable liquid flux, so that no waste of the flux occurs when curled can bodies are not being transferred from the stationary horn to the carrier-horns on the turret.

The carriers are radially arranged on a turret 61 which is revolubly mounted upon the sleeve 62 which extends up from the rearward portion of the pedestal 2 through the turret-hub and carries at its upper end the head 63. The turret is actuated from a crank-plate 64 carried at the upper end of the shaft 5. The crank-plate 64 is connected by a rod 65 with an arcuate plate 66 slidably held in an annular channel in the lower side of the turret. The plate 66 carries a pawl 67 which engages ratchet-teeth formed at the side of the annular channel, and thus intermittently moves the turret through an angle the same as that between the radial axes of the carriers. A braking device 68 is provided at one side of the turret to assist in overcoming its inertia at the conclusion of its movements. During the times that the turret is stationary it is secured in exact position by means of the locking-rod 69 which enters one of a series of holes in the under side of the turret. The rod 69 is actuated from the shaft 3, a cam 70 thereon moving a lever 71 which is fulcrumed on the side of the pedestal 2 and has its rearward end connected with the locking-rod.

Each of the carriers has a standard 72 of which the foot is secured to the turret and from the upper part of which the horn 73 extends out radially of the turret. At one side of the horn a gage-bar 74 is slidably connected therewith and on the lower side of the horn is a flat spring 75 of which the ends engage the gage-bar to yieldably hold the same so that its upper edge extends slightly above the upper edge of the horn. A clamp-plate 76 is pivotally mounted on the standard 72 so as to extend therefrom and to turn on an axis parallel with the horn. On the inner end of the clamp-plate pivot-shaft is secured a depending arm 77, and through the lower end of the arm passes loosely a rod 78 connected with the foot of the adjoining carrier-standard. A spring 79 disposed around the rod 78 engages the arm 77 to normally hold the edge of the clamp-plate down onto the carrier-horn. At each movement of the turret the end of one of the carrier-horns is brought opposite the end of the horn 42 which carries the curled blank, and the turret is stopped at a position such that the gage-bar 74 is alined longitudinally with the gage-bar 44. While the carrier is at this position the curled blank is carried onto it by the transporting device. During the placing of the curled sheet on the carrier-horn the clamp-plate 76 is raised out of engagement with the horn by means of the releasing lever 80. This lever is fulcrumed on the side of the head 63 and has a shoe 81 adapted to engage the head of an adjusting screw 82 carried by a laterally extending portion of the arm 77. The lever 80 is moved at the proper time by means of a cam 83 which is carried on the upper cam-shaft 84, the said shaft being driven by means of a chain 85 extending over idlers to the longitudinal cam-shaft 4. The release positions of the clamp-plate 76, arm 77, and lever 80 are indicated by dotted lines in Fig. 8.

As the curled blank passes onto the carrier-horn one edge of the blank passes under the gage-plate 86, being thereby held down onto the horn and remaining in engagement with the gage-bar 74. After the other edge of the sheet is past the gage-bar 44 it closes in over the gage-bar 74 between the same and the clamp-plate 76, and engages the side of the gage-plate 86. The clamp-plate then closes down toward the horn and holds the lapped edges of the blank in position. When the blank has been curled closely, that is to a smaller diameter than the can-body to be formed, the spring of the sheet is sufficient to cause it to close in over the gage-bar 74 to form the lap, but it is preferable not to curl the sheet so closely but to utilize the pressure of the wings 54 to cause the lapping of the ends. For this purpose a rise may be made in one of the rails 58 to cause an additional inward movement of the corresponding wing just at the completion of the rearward movement of the transporting device.

The gage-plate 86, at the proper time, is lowered into contact with the carrier-horn and is afterward raised away from the same to permit the turning of the turret, by means the cam 87 on the shaft 84. A yoke 88 extends around said cam and is connected with a bar 89 slidable vertically within the sleeve 62. The bar 89 supports the arm 90 with which the gage-plate 86 is yieldingly connected by rods 91 which extend slidably through the arm and around which are placed springs 92 which press the plate into engagement with the horn or, when the arm is raised, move the plate down as far as is permitted by the rods 91.

The lapped ends of the formed blank are soldered together when the carrier, by successive movements of the turret, has reached a position beneath the soldering-iron 93. The soldering iron is held in vertically adjustable relation to a body 94 which is slidably and removably held in horizontal guideways formed in an arm 95 supported by the bar 89. Said body 94 and the soldering-iron are given a continuous oscillating movement, there being for this purpose a pin 96 extending from the side of the soldering-iron, a connecting-rod 97 detachably connected with said pin extending to a pinion 98 supported on a stationary part of the frame, and the pinion being driven by a gear 99 carried on the shaft 84. The soldering-iron is heated by means of a suitable gas-burner 100 which is arranged on member 94 so that its flame impinges on the side of the iron. Wire or ribbon solder is fed to points beneath the soldering-iron by means of feed-rollers 101 mounted in a bracket 102 carried on the arm 95. The rollers are geared together at one end and at the other end one of them carries a ratchet-wheel 103. A pawl 104, having a pivoted connection with a bar 105 secured to the head 63, is arranged so that it can engage the ratchet-wheel 103 and turn the feed-rollers when the soldering devices and other parts supported by the arm 89 are raised by the action of cam 87. The feeding of the solder through the action of the pawl upon the ratchet-wheel is controlled so as to occur only when a carrier having a can-body on it is approaching the soldering position. The pawl is so arranged that after each engagement thereof with the ratchet-wheel the pawl is pushed away from the ratchet by the return of the parts to the lowered position. The pawl is restored to a position such that it will engage the ratchet-wheel when the parts are raised, by means of the devices shown in Figs. 6, 7 and 8. At each revolution of shaft 84 cam 106 lifts rod 107 which is connected with lever 108 pivoted on pin 109 which is slidable vertically in a guide 110 mounted on gage-plate 86. If a can-body is upon the carrier then the end of the lever 108 strikes the same when the rod 107 is lifted and the pin 109 is thus raised. If there is no can-body on the carrier then the end of the lever 108 swings down past the side of the carrier-horn and the pin 109 is not raised. When the pin 109 is raised the lever 114 is tilted back as shown in Fig. 6, and the rod 111, is pulled thereby. Such movement of the rod 111, acting through levers 112 and 113, restores the pawl 104 to such a position that it will turn the ratchet-wheel 103 when the parts are raised by the lifting of bar 89.

After the can-body is soldered it is held upon the carrier a sufficient time for the solder to cool, the carrier meanwhile passing to the ejecting position beneath the arm 117, said arm being carried on the head 63. As the carrier reaches this position a roller 115 carried on the arm 77 engages a track-piece 116 secured to head 63, and the clamp-piece 76 is thereby raised out of engagement with the can-body. The can-body is then pushed off the carrier by the finger 118 carried by a chain extending over the sprockets 119 and 120 mounted on the arm 117, as shown in Fig. 1. The sprocket 119 has a geared connection with a sprocket 121 and the latter is driven by a chain extending therefrom to a sprocket 122 on shaft 84.

The machine may be used to make can-bodies of any length less than the length of the carrier-horns or the width of the transverse table, and no adjustment need be made in the machine in order to produce can-bodies of various lengths if the diameters of the bodies are the same. The smallest can bodies which may be produced by the machine are those which are made from blanks that will just encircle the horn 42 or the carrier-horns, allowing of course for the necessary lap, and the largest can bodies which may be produced on the machine are limited only by the length of the transverse table or by the clearance provided adjacent the carrier-horn.

To adjust the machine for making can-bodies of different diameters it is merely necessary to vary the position of the roller 37 to produce the desired curvature of the blanks, and to adjust the transporting device so that the shelf 53 and wings 54 will properly engage the blank when it is curled. For slight variations in diameter it is unnecessary to adjust the position of roller 37, since the curvature given to the blank will be sufficiently controlled by a proper setting of the shelf 53 and wings 54.

To promote an even distribution and flow of the solder the bevel corners of the iron 93 are notched on the feed side with the deep notches 121 and on the other side with the shallower notches 122; see Figs. 13 and 14 of the drawing.

Briefly described, a cycle of operations of the machine is as follows: A blank is placed on the table 18 and transferred by the feed fingers 17 to the transverse feed table 19, whereupon the blank is then pushed by the feed fingers 26 through the curling device and the curled body blank delivered on to the stationary horn or mandrel 42. The slide 13 is then reciprocated and the curled can body blank transferred from the stationary mandrel 42 onto one of the receiving horns or mandrels 73 on the turret 61. During this transferring operation the edges of the curled blank are provided with flux by means of the wiper 142. After the curled can body blank is received onto one of the carrier horns 73, the edges of the blank are properly gaged by means of the gage plate 86 and gage bar 74, whereupon the clamp 76 is lowered to properly hold the edges of the blank in position after which the gage plate 86 is raised. The turret 61 is then given an intermittent rotation, and the curled, fluxed, can body blank is moved successively beneath the soldering devices, and the stripping or ejecting mechanism, and at the latter station the finished soldered can body is removed from the carrier onto a chute or other conveyer.

Claims:

1. In a machine of the character described, in combination: a feed table; a curling device; a blank feeder adapted to push the blank through the curling device; means for receiving the curled blank; and means for engaging the last portion of the blank passing through the curling device, to insure clearance of the blank from the curling device; substantially as specified.

2. In a machine of the character described, in combination: a feed table; a curling device; a blank feeder adapted to push the blank through the curling device; means for receiving the curled blank; and means for engaging the last portion of the blank passing through the curling device, to insure clearance of the blank from the curling device, said means including a plurality of fingers, disposed on the opposite side of the curling device to that on which the blank feeder is located; substantially as specified.

3. In a can-body forming and seaming machine, a carrier-horn, a depressible gage arranged on the horn, a yieldably impressed clamping member adapted to close upon the horn over the depressible gage, means for curling a body-blank, means alined with the carrier-horn for supporting the curled blank, means on said support for separating the ends of the curled blank, said separating means being alined with the depressible gage, means for moving the blank from the support onto the carrier-horn, means for moving the clamping member to a position such as to permit one end of the blank to pass between the same and the depressible gage and thereby lap over the other end of the blank, and means for limiting said lap, said means for moving the clamping member being operated independently of the means for limiting the lap.

4. In a can-body forming and lap-seaming machine, soldering devices, a horn, means for placing a curled body-blank upon said horn, a gage-bar arranged on the horn to engage one end of the blank, a gage-plate arranged to engage the other end of the blank, and a clamping-plate arranged to press the outer lapped end against the inner while they engage the gage-bar and gage-plate, to hold the lapped ends together while the seam is soldered, and separate means for operating said clamping plate and said gage-plate, substantially as specified.

5. In a can-body forming machine, a feed-table, feeding means for actuating body-blanks longitudinally of the table, a transverse feed-mechanism arranged to receive blanks from the longitudinal feeding means, curling means with which the blanks are engaged by the transverse feed-mechanism, means, including yieldingly mounted members, for receiving and retaining the blanks after they pass the curling means, means for stripping the blanks from said supporting means, and a reciprocating element connected with said stripping means and longitudinal feeding means to simultaneously actuate the same.

6. In a can-body forming machine, a table, a curling device arranged at one end of the table, a reciprocatable slide arranged upon the table and adapted to engage a body-blank lying thereon and push the same from its end through the curling device, and means, including yieldingly and adjustably mounted members, arranged to receive and support the blank after it passes through the curling device.

7. In a can-body forming machine, a curling device, rectilinear guiding means for holding a body-blank with one end adjacent to said curling device, and means for pushing the blank through the curling device, said means engaging the blank at the end thereof remote from the curling device, said curling device being of less width than the guiding means, whereby blanks provided with tearing tongues are adapted to be operated upon, substantially as specified.

8. In a machine of the character described, in combination: a curling device; and means located adjacent said curling device adapted to receive and support a blank which passes through the curling device, said means including a horn, a pair of wings located on opposite sides of the horn, separate supports for said wings, and means for adjusting said supports with the wings carried thereby relatively toward and from each other to thereby adapt the machine for forming cans of different sizes, substantially as specified.

9. In a machine of the character described, in combination: a curling device; and means located adjacent said curling device adapted to receive and support a blank which passes through the curling device, said means including a horn, a pair of wings located on opposite sides of the horn, separate supports for said wings, and mechanism for simultaneously adjusting said supports with the wings thereon toward and from each other to thereby adapt the machine for making different size cans, substantially as specified.

10. In a machine of the character described, in combination: a curling device; and means located adjacent said curling device adapted to receive and support a blank which passes through the curling device, said means including a horn and a pair of pivotally mounted, yieldingly controlled wings disposed on opposite sides of the horn; substantially as specified.

11. In a machine of the character described, in combination: a stationary horn adapted to support a curled blank; a turret having a plurality of carrier-horns thereon, movable successively into alinement with the stationary horn; means for transferring a curled blank from the stationary horn to the carrier-horn, including a slide having movably mounted members thereon disposed on opposite sides of the stationary horn; and means for causing said members to move toward each other during the transferring operation; substantially as specified.

12. In a machine of the character described, in combination: a stationary horn adapted to support a curled blank; a turret having a plurality of carrier-horns thereon movable successively into alinement with the stationary horn; means for transferring a curled blank from the stationary horn to the carrier-horn; and a flux applying device adapted to be supplied with the flux intermittently and only during the transferring of a curled can body blank from the stationary horn to a carrier-horn; substantially as specified.

13. In a machine of the character described, in combination: a feed table; a curling device; a blank feeder adapted to push the blank through the curling device; means for receiving the curled blank; and means for engaging the last portion of the blank passing through the curling device, to insure clearance of the blank from the curling device, said means including a plurality of fingers, disposed on the opposite side of the curling device to that on which the blank feeder is located; one of said fingers being substantially longer than the others and adapted to engage a tearing tongue on the blank; substantially as specified.

LEE C. SHARP.

Witnesses:
I. W. BROWN,
C. W. ANDERSON.